March 14, 1961  S. G. BAIR  2,975,009
JOURNAL LUBRICATOR

Filed June 13, 1958  2 Sheets-Sheet 1

INVENTOR
Stanley G. Bair

BY
Diggins & LeBlanc
ATTORNEYS

March 14, 1961  S. G. BAIR  2,975,009
JOURNAL LUBRICATOR
Filed June 13, 1958  2 Sheets-Sheet 2

INVENTOR
Stanley G. Bair
BY Diggins & Le Blanc
ATTORNEYS

United States Patent Office 2,975,009
Patented Mar. 14, 1961

2,975,009
JOURNAL LUBRICATOR

Stanley G. Bair, % Security Railway Products,
120 S. La Salle St., Chicago, Ill.

Filed June 13, 1958, Ser. No. 741,889

4 Claims. (Cl. 308—243)

This invention relates to lubricators for journal bearings of railway car journals and other similar journal bearings, and particularly to lubricators of that type comprising an oil absorbing and transmitting or distributing elastic or resilient pad adapted to be disposed in the bottom of a journal box and held in contact with the surface of the journal.

This pad serves as a reservoir for lubricating oil and as a distributor for feeding such oil and the oil stored in the box to the bearing surface of the journal.

Increases in the size and weight of cars equipped with journal bearings and the load weight carried thereby and particularly increases in the speed of trains, have resulted in a great increase in the possibility and seriousness of "hot boxes" caused by overheating of journal bearings due to inefficient or insufficient application of lubricating oil as well as other important contributing causes.

One major source of difficulty in lubricating axle journals evidenced in the prior art has been the lack of sufficient application of lubricating oil to the outer and inner flanges of the journal, more commonly referred to as the collar and fillet respectively. Since on sudden jarring of the car, as in sudden starts and stops, or in a swaying occasion by high speeds and curves, the journal is often displaced relative to the car and journal box, the collar or fillet or both move into contact with the journal bearing. Attempts to provide adequate lubricator contact to the collar and fillet surfaces of journals in order to supply adequate lubrication to these parts, in the form of added material or buffers, have resulted in the material being picked up by the rough edges, nicks or burrs on the collar or fillet causing the material of the lubricator to be swept up by the journal on one side of the bearing, thereby cutting off the oil supply to these surfaces. In waste packed journal boxes this was known as "waste grab."

A second major difficulty experienced with the hitherto used pad lubricators has been their tendency to become displaced about the journal and to pack up on one side of the journal box. This likewise results in particles of the lubricating material being swept up or "grabbed" by the journal onto one side of the bearing, tends to distort the lubricating pad and further inhibits proper lubrication of the journal. In addition, difficulty has been experienced with such devices in their lack of ability to prevent dirt and dust and other foreign matter from gaining access to the journal and bearing surfaces. Where such foreign matter reaches the journal and bearing surfaces, it tends to score them and also tends to clog the juncture of the journal and bearing, thereby wiping oil off the journal, so that it cannot reach and properly lubricate the bearing.

The present invention avoids the above-mentioned and other difficulties by providing a lubricating pad employing an oil-resistant mat that extends around the major portion of the lower part of the journal box. In a so-called "ribbed" box, the ends of the mat, in cooperation with parallel ribs along the inner side wall of the journal box, act to maintain the lubricating pad of the present invention securely anchored at the bottom of the journal box. As a result, rotation of the pad above the journal and the subsequent clogging of the bearing surface on one side of the journal is avoided.

Secured to the top surface of the mat is one or a plurality of spaced compressible and expandable resilient cores bearing on the underside of the journal. Passing over the cores and securely affixed to the mat on each side of the cores is a fabric casing having an upper exposed pile surface adapted to be brought into contact with the lower portion of the journal by the resilient force of the compressible and expandable cores.

An important feature of the present invention is the incorporation of end closures for the core pockets formed by the overlapping fabric casing. The end closures are formed from the same material and may be integral with the fabric casing and are adapted to be sewn or otherwise fastened in such a manner as to apply pressure to the lower portion of each end of the cores. This results in a bulging of the core material at the end portions of the cores adjacent the journal causing the core and covering fabric casing to overhang at each end providing intimate engagement between the pad surface and the channels formed at the collar and fillet junctions.

The improved contact provided by the overhanging end portions of the lubricating pad of the present invention against the journal collar and fillet provides improved lubrication for the journal bearing. In addition, the sealing features of the overhanging end in combination with the mat at the bottom of the journal box provide improved means for preventing dirt and dust and other foreign matter from gaining access to the journal and bearing surfaces.

It is accordingly one object of the present invention to provide an improved lubricating device for the journals of railway cars and similar other journals.

Another object of the present invention is to provide an improved journal box lubricating unit having a high capillarity yarn pile for supplying lubricant, supported by a securely anchored yielding, resilient, oil impervious body.

An additional object of the present invention is to provide a journal box lubricating unit having at least one yielding, resilient, oil impervious body covered by a single piece of pile fabric.

Still another object of the present invention is to provide a journal box lubricating unit having extended end portions for firmly contacting the journal shoulder and fillet and for supplying additional lubricant flow thereto.

A further object of the present invention is to provide a journal box lubricating unit having at least one yielding, resilient, oil impervious body covered by pile fabric that is securely anchored to a felt pad to prevent excessive slippage of the body about the journal.

A still further object of the present invention is to provide a journal box lubricating unit capable of preventing the access of dirt and foreign matter to the journal and bearing surfaces.

Further objects and advantages of the invention will become apparent upon reference to the following specification, claims and drawings wherein:

Figure 2:
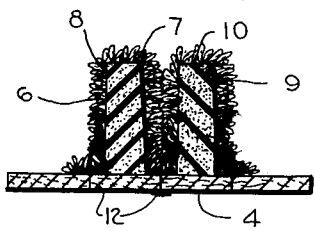
Figure 2 is a cross sectional view of the improved lubricating pad of Figure 1.

Referring more particularly to the several figures of the drawing, 2 generally denotes the lubricating device or pad of the present invention. Pad 2 is composed of a flat, substantially-rectangular felt mat 4 upon which rests absorbent jacket material or casing 6 of suitable textile fabric having an upper exposed napped pile surface 8. Casing 6 is secured at spaced intervals to felt mat 4 by preferably a series of brass rivets 12 which pass entirely through the fabric casing and felt mat as best shown in Figure 2.

Figure 3:
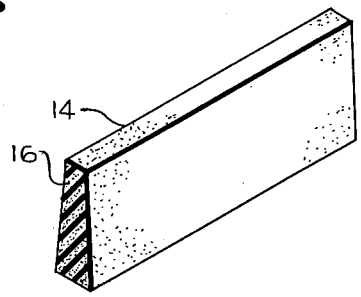
Figure 3 shows a resilient core adapted to be enclosed within the pockets of the lubricating pad of Figure 1.

As indicated in the drawings the casing material 6 is constructed to provide a pair of elongated pockets 7 and 9. Each pocket surrounds and tightly encloses a core of resilient material 14 shown separate from the casing in Figure 3. Core 14 may be rectangular in cross section but preferably tapers toward the top portion 16 to provide better contact with the axle journal. Pockets 7 and 9 formed in casing 6 are stitched front and rear as indicated at 10 to securely retain the cores 14 in their respective pockets. Pull tape 11 is shown as extending completely around the lubricator pad 2 and passes through the space separating pockets 7 and 9. If desired, tape 11 may be stitched to felt pad 4 as well as to casing 6 and to the pile loops to provide reinforcement and to additionally secure the casing and pile surface to the pad. A grommet 13 is provided in projecting end 15 of the pull tape and additional grommets 17 may be provided in mat 4 for easy insertion and removal of the lubricator from a journal box.

The casing fabric 6 is designed of a strong and durable permeable textile fabric having an outer-loop pile or napped surface and by way of example only may consist of one-fourth inch gauge chenille having a three-quarters to one inch pile loop height with six loops per inch. The chenille is washed and pre-shrunk before being placed in use on mat 4. Cotton pile fabric while less suitable may also be employed. The core bodies 14 are made of cellular resilient materials such as sponge rubber, or sponge plastic, for example, neoprene foam, and are constrained under slight compression by the inner surfaces of pockets 7 and 9. The cores are chemically stable, have good heat resistance, are oil-resistant and have a low-compression set. Dimensions of the cores are such as to snugly fit within the pockets and hold the same spread. In this spread condition the cores are compressed on all sides and keep the lubricating device in a state of compression with its pile surfaces pressed against the surface of the journal. Felt pad 4 as defined in terms of tensile strength, density and other qualities may be in a range from SAEF 6 to SAEF 3 for felt mats. Wire stitching, in lieu of the brass rivets 12 as shown in Figure 2 may be employed to secure the casing material to the mat 4. Likewise cotton stitching can be used but is less desirable because of its tendency to wear.

Figure 4:
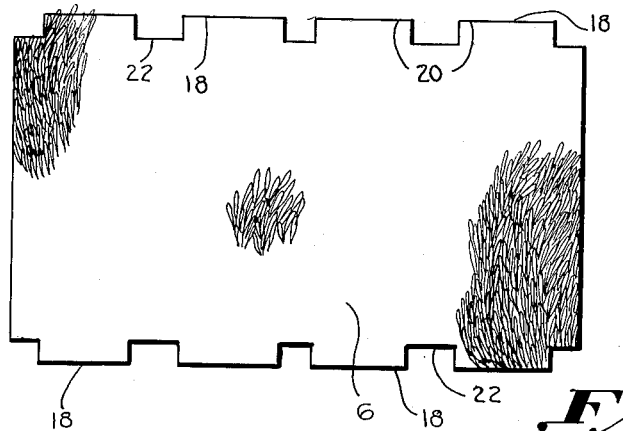
Figure 4 is a plan view of the absorbent jacket or casing material of Figure 1.

While the casing 6 may be made of a plurality of pieces of material, it is preferably formed of single piece rectangular construction. Alternatively a series of end pieces or flaps 18 may be provided along each side of the casing 6 as shown in Figure 4 for the purposes of closing each end of the pockets 7 and 9. As shown in this embodiment, flaps 18 exhibit a slight taper indicated at 20 adjacent the narrow portions 22 of casing 6, which latter portions cover the top area 16 of the cores 14. The tapered flaps 18 provide means for snugly and securely closing the ends of pockets 7 and 9 and may also be used to provide an overhang at the ends of cores 14 as will be more fully explained hereafter.

Figure 5:
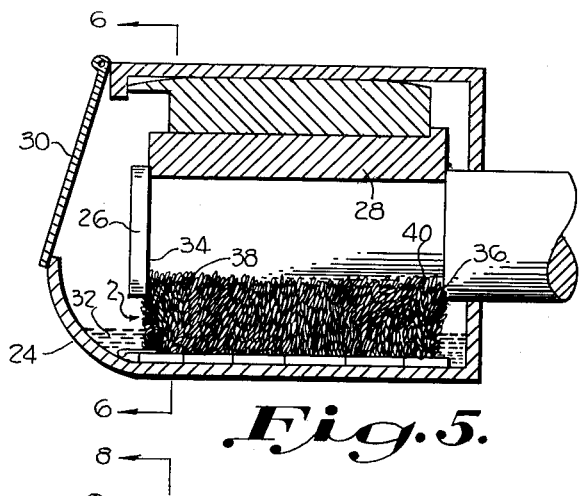
Figure 5 is a longitudinal sectional view through a journal box having a lubricator constructed in accordance with the present invention.

Figure 5 shows a longitudinal sectional view of a conventional journal box with the lubricating device 2 of the present invention in operative position, contacting the lower surface of a railroad axle journal 26 supported in a journal box 24. Journal 26 having an outer collar 34 and an inner fillet 36 supports a conventional journal bearing 28. Journal box 24 includes a pivoted doorway or door opening 30 through which the lubricating device 2 may be inserted into the journal box.

Figure 6:
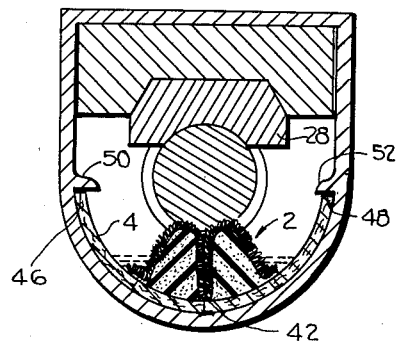
Figure 6 is a sectional view taken along the lines 6—6 of Figure 5.

As best shown in Figure 6, end portions 46 and 48 of the mat forming a part of lubricating device 2 project a substantial distance up each side of the journal box 24. Ends 46 and 48 of mat 4 are adapted to contact a pair of internal ribs 50 and 52 respectively formed integrally with the inside surface walls of the journal box 24. A slight rotation of the lubricating device 2 caused by the sweeping action of journal 26 brings one or the other of end portions 46 and 48 into contact with its respective adjacent rib preventing further displacement of device 2, thus avoiding any tendency of the lubricating device to be drawn into one side of the journal box. Mat 4 in this way avoids the possibility of the lubricating device being packed into one side of the journal causing a clogging of the bearing surface which would tend to cut off the supply of oil to that side of the bearing.

The twin pockets 7 and 9, as shown in the drawings are separated by two intervening parallel pile surfaces of casing 6 as indicated at 42. The adjacent surfaces of casing 6 at 42 form essentially a double wall with pile loops overlapped, internested or commingled together to form with the fabric plys an oil conductor from the oil reservoir 32 of large storage capacity and are adapted to convey by capillary action a large volume of oil to the surface of the journal.

Figure 1:
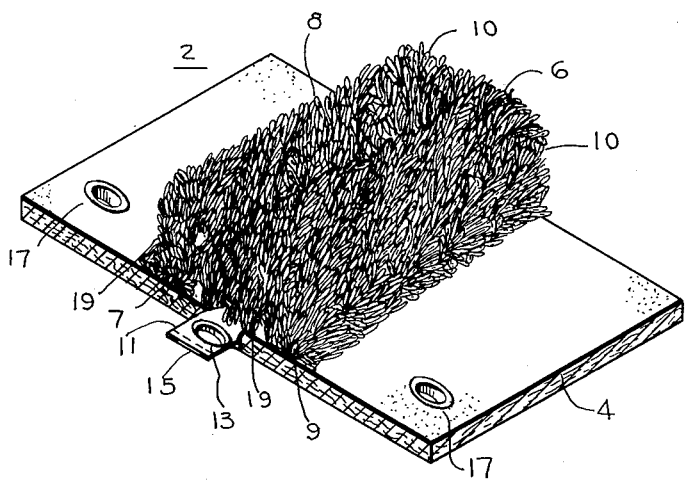
Figure 1 is a perspective view of the improved lubricating pad of the present invention.

The stitching operation employed in securing the casing material over the ends of the cores 14 to close pockets 7 and 9 provide means for securely impressing the lubricating device into the corner channels of the journal 26 occurring at the juncture of the collar 34 and fillet 36. In practice, the ends are compressed and brought together as indicated at 19 in Figure 1 and are sewn from the bottom portion of the core adjacent mat 4 in the upward direction toward the top surface of the core preferably for a distance of about one inch. Cores 14 are of such resilience that a slight pressure applied to the bottom end portion of each core causes the top end portion to bulge out and overhang the end adjacent the mat. Such overhang may be simply and easily produced by merely beginning the stitching operation at the mat side of the core ends and proceeding in the upward direction. The resulting overhang indicated at 36 and 38 in Figure 5 firmly contacts the collar and fillet providing a positive seal at these points with improved lubricating action.

Figure 7:
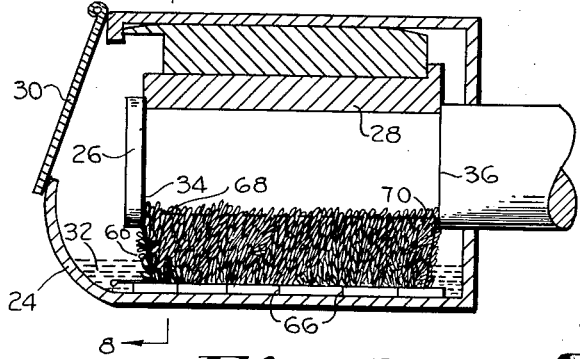
Figure 7 is a longitudinal sectional view through a modified embodiment of a journal box having a lubricator constructed in accordance with the present invention.
Figure 8:
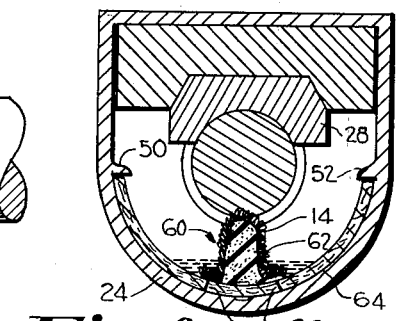
Figure 8 is a sectional view taken along the line 8—8 of Figure 7.

Figures 7 and 8 show longitudinal and cross-sectional views of a modified embodiment of the lubricating device of the present invention. As indicated, the modified lubricating device employs a single pocket and core of a construction similar to that shown in the previous figures of the drawing. Corresponding parts of the drawing are similarly labeled in Figures 7 and 8. As indicated, a mat 64 extends around a major portion of the lower part of journal box 24 and supports a single core 14 firmly retained in a pile fabric covered casing 62. Brass rivets 66 are similarly employed to securely fasten casing 62 to the mat 64. The modified pad indicated generally at 60 is centrally located within the journal box 24 and extends substantially the entire length of the journal surface. A similar stitching operation applied to the ends of the core 14 produce overhangs at each end indicated at 68 and 70 which firmly contact, by virtue of the resilient pressure of the sponge-like core, channels in the journal 26 occurring at the collar and fillet junctions.

From the foregoing description taken in conjunction with the drawings, it will be apparent that in operation the lubricating device of the present invention will be held under compression in the journal and will always be centered for action with relation to the journal. In its working section, oil stored under pressure in the box and resilient cores will be constantly fed to the journal by the capillary attraction supplemented by a pumping action produced by relative motion between the box and journal and resultant compression and reaction of the resilient cores. As the oil is applied to the journal in its rotation in either direction by a continuous absorbent soft-pile surface formed by the upper wall of the lubricator jacket, a uniformly effective application of oil to the journal is obtained without the liability of damage inherent in the use of unsecured pad devices. The extensive length of the mat in combination with the internal journal box rib positively retains the lubricating device in the center of the journal box. In addition, the surrounding mat serves to prevent foreign substances collected at the bottom of the journal box from reaching the lubricating surface and damaging the bearing and journal surfaces. Resilient contact is maintained at all times between the flange portions of the journal and the lubricating pile surface. The cores may be made of plastic foam of open cellular construction or sponge rubber of any degree of durability and resilience desired and are so mounted that access may be easily had to them so that damaged cores may be removed and readily replaced by new cores whenever necessary. The present invention provides a novel lubricating device of simple, economical construction having improved durability and lubricating qualities which, in use, minimize the occurrence of hot boxes and their attendant undesirable effects.

The invention may be embodied in other specific forms without departing from the spirit or essential characteristics thereof. The present emobdiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a lubricated journal box containing a journal having a spaced collar and fillet and having substantially centrally positioned parallel ribs along the inside side wall surfaces thereof, the improvement comprising a rectangular flexible pad resistant to oil, said pad positioned below said journal and covering the greater portion of the bottom and side walls of said box between said ribs, a fabric casing having an exposed pile surface connected at spaced intervals to said pad and defining therewith at least one pocket extending substantially the length of said journal, a compressible and expandable core of resilient material confined in said pocket for pressing a substantial area of said pile surface against said journal, and means for compressing the portion of each end of said core adjacent said pad to cause the portion of each end of said core remote from said pad to extend laterally beyond said adjacent portion and firmly contact the collar and fillet of said journal.

2. A lubricator for use in a journal box containing a journal having a spaced collar and fillet and having substantially centrally positioned parallel ribs along the inside side wall surfaces thereof, said lubricator comprising a rectangular flexible pad resistant to oil, said pad when positioned below a journal in a journal box covering the greater portion of the bottom and side walls of the journal box between the journal box ribs, a fabric casing having an exposed pile surface connected at spaced intervals to said pad and defining therewith at least one pocket extending substantially the length of the journal, a compressible and expandable core of resilient material confined in said pocket for pressing a substantial area of said pile surface against the journal when the lubricator is positioned beneath the journal in a journal box, and means for compressing the portion of each end of said core adjacent said pad to cause the portion of each end of said core remote from said pad to extend laterally beyond said adjacent portion and firmly contact the collar and fillet of the journal when the lubricator is positioned beneath the journal in the journal box.

3. A lubricator for use in a journal box including a journal having a spaced collar and fillet passing therethrough comprising an oil resistant flexible felt pad adapted to be positioned beneath said journal, a fabric casing having an exposed pile surface connected to spaced portions of said pad and defining in conjunction with the surface of said pad at least two pockets, a compressible and expandable core of resilient material confined in said pockets for pressing a substantial area of pile surface against said journal, the front and rear pocket edges of said lubricator resiliently contacting said collar and fillet when said lubricator is placed in a journal box beneath a journal, said felt pad extending a substantial distance laterally beyond said pockets and curving upwardly along the journal box walls when said lubricator is placed beneath the journal in a journal box so as to position said lubricator in the journal box, said pockets extending across only a limited portion of the lateral distance of said pad with the outermost edges of said pockets extending downwardly from the line of contact with the journal when in a journal box to define in conjunction with the lateral extensions of said pad generally V-shaped cavities on opposite sides of said lubricator for trapping foreign matter entering the journal box, whereby lubricant passing upwardly through the center of said lubricator is kept free of foreign material by the filtering action of said lubricator at the bottom of said cavities.

4. In a lubricated journal box containing a journal having a spaced collar and fillet, the improvement comprising a rectangular flexible oil resistant felt pad, said felt pad being positioned below said journal in said journal box, a fabric casing having an exposed pile surface connected to spaced portions of said pad and defining in conjunction with the surface of said pad at least two pockets, a compressible and expandable core of resilient material confined in said pockets for pressing a substantial area of pile surface against said journal, the front and rear pocket edges of said lubricator resiliently contacting said journal collar and fillet, said pad extending a substantial distance laterally beyond said pockets and curving upwardly along the journal box walls for engagement with the ribs of a journal box to position said lubricator in said journal box, said pockets extending across only a limited portion of the lateral distance of said pad with the outermost edges of said pockets extending downwardly from the line of contact with said journal to define in conjunction with the lateral extensions of said pad generally V-shaped cavities on opposite sides of said lubricator for trapping foreign matter entering the journal box, whereby lubricant passing upwardly through the center of said lubricator is kept free of foreign material by the filtering action of said lubricator at the bottom of said cavities.

References Cited in the file of this patent

UNITED STATES PATENTS

| 2,213,001 | Gundel | Aug. 27, 1940 |
| 2,713,524 | Hagy | July 19, 1955 |
| 2,807,803 | Rockwell | Sept. 24, 1957 |
| 2,827,346 | Runton | Mar. 18, 1958 |
| 2,936,198 | Harkenrider | May 10, 1960 |